United States Patent
Bergman et al.

(10) Patent No.: US 8,526,397 B2
(45) Date of Patent: Sep. 3, 2013

(54) TTI BUNDLING INDICATION TO NON-SERVING BASE STATION

(75) Inventors: Johan Bergman, Stockholm (SE); Henrik Enbuske, Stockholm (SE); Dirk Gerstenberger, Stockholm (SE); Kai-Erik Sunell, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 257 days.

(21) Appl. No.: 12/989,519

(22) PCT Filed: Dec. 29, 2008

(86) PCT No.: PCT/SE2008/051565
§ 371 (c)(1),
(2), (4) Date: Oct. 25, 2010

(87) PCT Pub. No.: WO2009/131509
PCT Pub. Date: Oct. 29, 2009

(65) Prior Publication Data
US 2011/0038352 A1 Feb. 17, 2011

Related U.S. Application Data

(60) Provisional application No. 61/047,645, filed on Apr. 24, 2008.

(51) Int. Cl.
*H04W 4/00* (2009.01)

(52) U.S. Cl.
USPC ......................................................... 370/331

(58) Field of Classification Search
USPC ............. 370/310, 310.2, 315, 328, 335, 342, 370/331, 314, 321, 336, 337; 455/432.1, 455/436, 442, 452.1

See application file for complete search history.

(56) References Cited

U.S. PATENT DOCUMENTS

| | | | |
|---|---|---|---|
| 6,970,716 B2 * | 11/2005 | Rune et al. | 455/552.1 |
| 2006/0062173 A1 * | 3/2006 | Cheng et al. | 370/328 |
| 2006/0092972 A1 | 5/2006 | Petrovic et al. | |
| 2007/0183451 A1 | 8/2007 | Lohr et al. | |
| 2007/0189282 A1 | 8/2007 | Lohr et al. | |
| 2007/0297360 A1 * | 12/2007 | Joachim et al. | 370/329 |
| 2010/0220647 A1 * | 9/2010 | Baker et al. | 370/328 |

OTHER PUBLICATIONS

R2-081446; 3GPP TSG-RAN WG2 #61bis; "RAN2 aspects of the solutions Subframe Bundling," Mar. 31-Apr. 4, 2008.*
R2-081103; TSG-RAN WG1 # 52; "Reply LS on Uplink Coverage for LTE," Feb. 11-15, 2008.*

(Continued)

*Primary Examiner* — Anh Ngoc Nguyen
(74) *Attorney, Agent, or Firm* — Nixon & Vanderhye, P.C.

(57) ABSTRACT

The technology applies to a cellular radio communication system in which a mobile radio terminal transmits information in transmission time intervals (TTIs) that is received by a serving base station and by one or more non-serving base stations. A number N of hybrid automatic repeat request (HARQ) transmissions transmitted together by the mobile terminal is determined. An HARQ transmission includes a first transmission, one or more retransmissions of the first transmission, or both. An indication of the number N of HARQ transmissions is provided either directly or indirectly to the one or more non-serving base stations so that the one or more non-serving base stations can take the number N into account when combining HARQ transmissions received from the mobile terminal.

18 Claims, 6 Drawing Sheets

(56) References Cited

OTHER PUBLICATIONS

R1-050751; 3GPP TSG-RAN WG1; "UE Power Scaling Behaviour (Bcoffee)," Aug. 29-Sep. 2, 2005.
R1-081103; TS-RAN WG 1; "Reply LS on Uplink Coverage for LTE," Feb. 11-15, 2008.
R1-081619; 3GPP TSG-RAN WG1; EUL Coverage Enhancements,: Mar. 31-Apr. 4, 2008.
R2-080048; 3GPP TSG-RAN WG2; "Smaller TB Sizes for E-DCH," Jan. 14-18, 2008.
R1-080806; 3GPP TSG-RAN WG1; "Reducing Smallest E-TFCI Value," Feb. 11-14, 2008.
Rui, et al., "Coverage Study for VoIP over Enhanced Uplink," in proceedings of VTC Spring 2005.
R1-081880; 3GPP TS RAN WG1; "EUL Coverage Enhancements," May 5-9, 2008.
International Search Report for PCT/SE2008/051565, mailed Jun. 5, 2009.
International Preliminary Report on Patentability with 3 Amended sheets, mailed Aug. 30, 2010.

\* cited by examiner

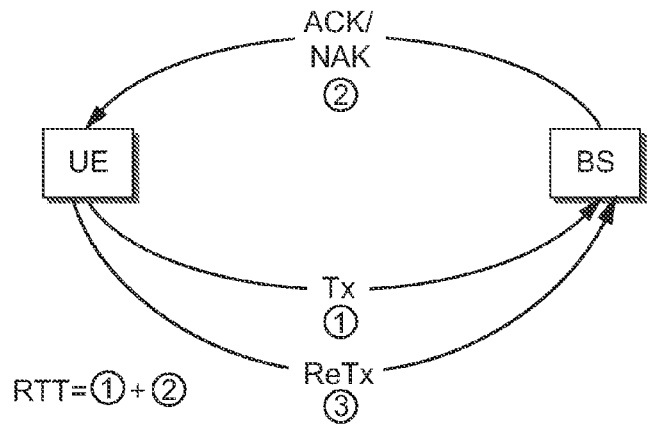
FIG. 1
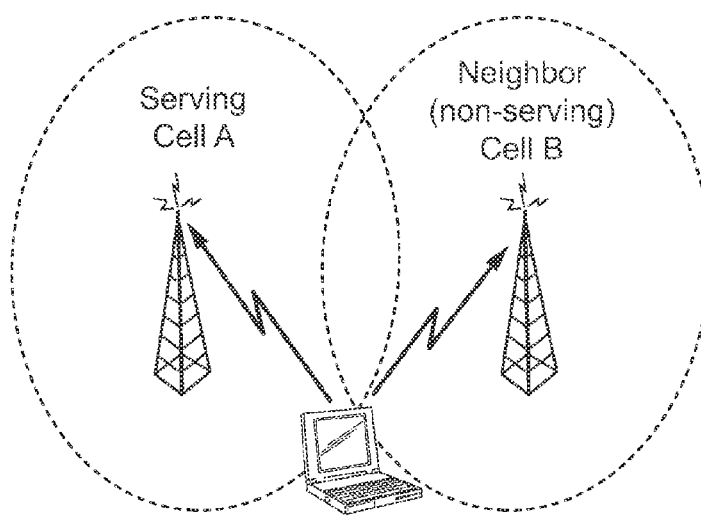
FIG. 2
Each HARQ retransmission occurs 8
TTIs (16 ms) after the previous one
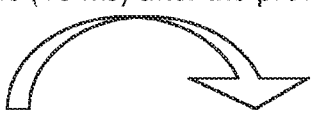
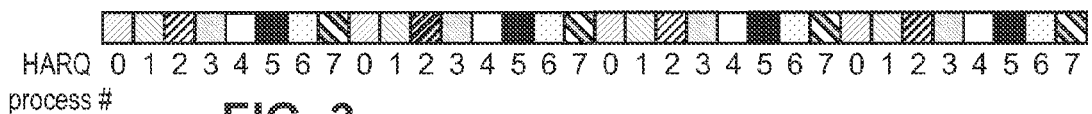
FIG. 3 Timing diagram for EUL with 2-ms E-DCH TTI

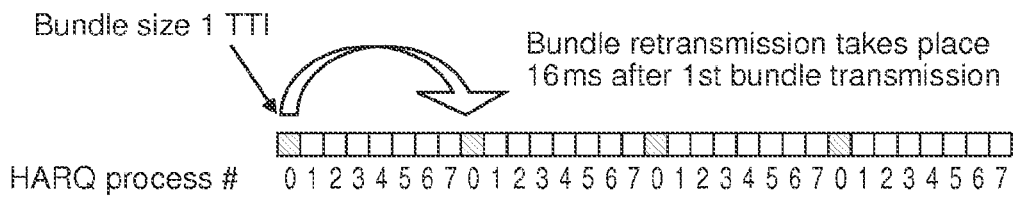
FIG. 4A  Timing diagram for TTI bundling with a bundle size of 1 TTI (2 ms), i.e. no TTI bundling
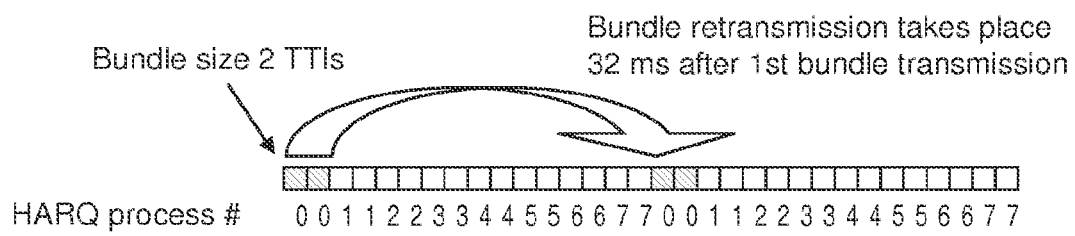
FIG. 4B  Timing diagram for TTI bundling with a bundle size of 2 TTIs (4 ms)
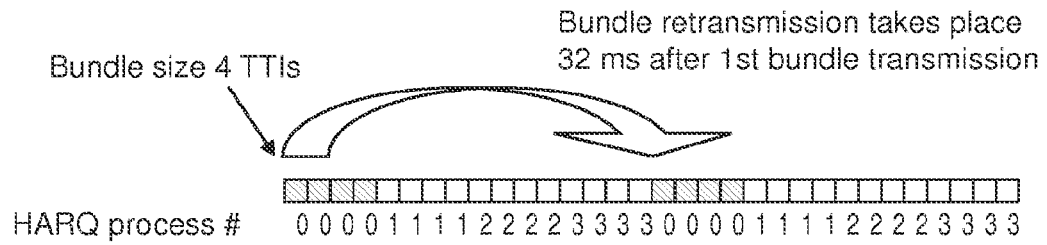
FIG. 4C  Timing diagram for TTI bundling with a bundle size of 4 TTIs (8 ms)
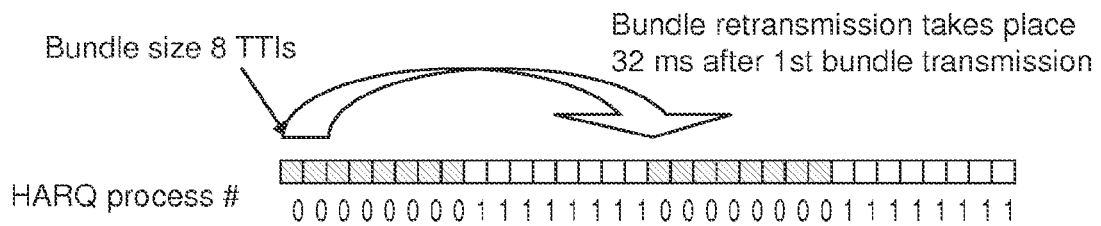
FIG. 4D  Timing diagram for TTI bundling with a bundle size of 8 TTIs (16 ms)

TTI BUNDLING INDICATION TO NON-SERVING BASE STATION

This application is the U.S. national phase of International Application No. PCT/SE2008/051565 filed 29 Dec. 2008, which designated the U.S. and claims the benefit of U.S. Provisional No. 61/047,645 filed 24 Apr. 2008, the entire contents of each of which are hereby incorporated by reference.

TECHNICAL FIELD

The technical field relates to radio communications systems, and more particularly, to a mobile communication involving serving and non-serving radio base stations.

BACKGROUND

In a typical radio communications system, mobile radio communications terminals, sometimes referred to as user equipment units (UEs), communicate via a radio access network (RAN) and other networks like the Internet. The radio access network covers a geographical area divided into cell areas, with each cell area being defined as the radio coverage area of a base station (BS) at a base station site, which in some networks is also called a "NodeB".

The evolution of mobile radio interface standards is strongly focused on packet access technologies where small data units or packets carry the data over the communication medium and a packet header describes the transferred data. See, for example, S. Keshav, An Engineering Approach to Computer Networking, Addison-Wesley professional computing series, ISBN 0-201-63442-2.

One important requirement for these services is a short Round Trip Time (RTT), which is the time that it takes for a packet to traverse from one machine to another and back again. FIG. 1 illustrates the RTT between a user equipment (UE) and a base station (BS). The reason for this requirement is that many upper layer protocols and applications may be delay-sensitive. The Universal Mobile Telecommunication System (UMTS) standard evolution addresses this requirement by reducing the Transmission Time Interval (TTI), defined as the duration of data transmission where coding and interleaving is performed, from 10, 20, 40 and 80 ms down to 2 ms. In the enhanced dedicated channel (E-DCH), which is the transport uplink channel in Wideband Code Division Multiple Access (WCDMA) High-Speed Uplink Packet Access (HSUPA), the TTI contains one transport block, the transport block size is flexible and indicated by the E-DCH Transport Format Combination Identifier (E-TFCI).

Although a short TTI is generally beneficial for upper layer protocols and applications, there is a downside as well. The reliability of the transferred data is a monotonic (increasing) function of the received energy per information bit, and the received energy per information bit, in turn, depends on the transmission power and the transmission time. Because the transmission of data using 2 ms TTIs requires higher transmission power, and is thus in a transmission power limited situation, that transmitted data is more vulnerable to errors than the data transmitted using 10, 20, 40, or 80 ms TTIs. As a result, it is difficult to ensure the same coverage as older, legacy radio interfaces, e.g., previous UMTS releases. The packet data service coverage is especially limited in the uplink direction because the mobile terminal cannot use as high a transmitter power as the base stations in the network transmitting downlink.

One approach to the coverage problem is to employ retransmission (ReTx) protocols where the receiving side requests packet retransmissions from the transmitting side until the packet is successfully received (or the maximum number of retransmission is reached). See the example ReTx (3) in FIG. 1 where the base station requests a ReTx from the mobile terminal. A further improvement is to combine the retransmission protocol with soft-combining functionality where the receiver does not discard erroneously-received packets, but instead buffers their soft-bit values and combines them with the soft-bits values of the retransmitted packets. This is referred to as Hybrid ARQ (HARQ). Although HARQ retransmissions can help alleviate the above-described coverage problems, the number of HARQ retransmissions cannot be too large, otherwise the need for costly additional base station receiver processing resources increases. Moreover, if a large percentage of active mobile terminals are performing frequent HARQ retransmissions, the cost for the provided packet service increases as does the packet delay in the communication, the latter being particularly undesirable for real-time services such as voice.

With these aspects in mind, "Transmission Time Interval (TTI) bundling" (also known as "autonomous retransmissions") was suggested for LTE uplink (UL) (see 3GPP Tdoc R1-081103, "Reply LS on Uplink Coverage for LTE", LS from RAN WG1 to RAN WG2 incorporated by reference into this application) as well as for WCDMA HSUPA (see 3GPP Tdoc R1-081619, "EUL coverage enhancements" incorporated by reference into this application). Each TTI bundle corresponds to a single HARQ process and a single block of data, e.g., a single packet. TTI bundling improves coverage without introducing unacceptable delays due to many HARQ RTTs by allowing the mobile terminal to bundle the first HARQ transmission of a data block/packet with a number (N−1) of consecutive HARQ retransmissions of that same data block/packet, i.e., in total "N" HARQ transmissions, without waiting for a negative HARQ acknowledgement (NAK) before making a next one of the N−1 HARQ transmissions. The underlying assumption is that for a mobile terminal with bad coverage, the required number of HARQ retransmissions is expected to be relatively high, so it is highly likely that the first HARQ transmission and some number of HARQ retransmissions would be NAK'ed anyway. Hence, there is no strong reason to wait for the HARQ ACK/NAK for the first HARQ transmission before starting another HARQ retransmission of that same data block/packet.

If the mobile terminal does not receive a positive HARQ ACK for the TTI bundle of N HARQ transmissions, i.e., for either the entire bundle or for at least one HARQ transmission in the TTI bundle, it may make further HARQ retransmissions (single or bundled) until the mobile terminal receives a positive HARQ ACK or reaches the maximum number of HARQ retransmissions. TTI bundling may only be used for mobile terminals with bad coverage because although TTI bundling improves coverage for the mobile terminal, it may have some drawbacks in terms of user throughput, battery consumption, and system capacity. Hence, it is desirable to control the number of HARQ retransmissions in each TTI bundle.

Often, deteriorating coverage from a serving base station is experienced as the mobile terminal moves from a cell area of the serving base station towards one or more cells serviced by a non-serving base station. FIG. 2 illustrates a cellular communications system with a mobile radio terminal communicating with a serving cell A and a non-serving cell B. The mobile terminal typically monitors broadcast signals from neighboring non-serving base stations and keeps a list of the non-serving base stations with the best signal reception. Handover (either hard or soft) usually occurs at some point with one or more of the non-serving base stations in that list.

Handover presents a problem with respect to TTI bundling. If a non-serving base station involved in a soft handover with the mobile connection (or soon to take over the mobile connection in a hard handover) is not made aware that TTI bundling with N HARQ transmissions per bundle is taking place, then the non-serving base station will likely not properly soft combine the different HARQ transmissions. The result is performance degradation caused by buffer corruption when the non-serving base station tries to combine HARQ transmissions that correspond to different data segments and reduced macro diversity gain when the non-serving base stations cannot contribute to the overall reception performance due to this buffer corruption.

SUMMARY

The technology that addresses these issues is for use in a cellular radio communication system in which a mobile radio terminal transmits information in transmission time intervals (TTIs) that is received by a serving base station and by one or more non-serving base stations, which occurs for example when the serving base station, the one or more non-serving base stations, and the mobile terminal are involved in a handover. A number N of hybrid automatic repeat request (HARQ) transmissions transmitted together as a group by the mobile terminal is determined. N is preferably a positive integer. An HARQ transmission includes a first transmission, one or more retransmissions of the first transmission, or both. The number N of HARQ transmissions is provided either directly or indirectly to the one or more non-serving base stations so that the one or more non-serving base stations can take the number N into account when combining HARQ transmissions received from the mobile terminal.

Each HARQ transmission in the group corresponds to a same segment of data associated with one HARQ process. The N HARQ transmissions in the group correspond to a TTI bundle containing one or more TTIs. So there is one HARQ process per TTI bundle. In a non-limiting example WCDMA HSUPA type system implementation, each TTI corresponds to one transport block, the size of which may be varied.

The technology may be implemented in a variety of ways—none of which is limiting. For example, the technology may be implemented in the mobile terminal. The mobile terminal can receive the number N from a controller coupled to the serving base station. The controller can be located in the serving base station or in a radio network controller coupled to the serving base station and the one or more non-serving base stations.

Alternatively, the technology may be implemented in the serving base station. The serving base station can either determine or receive N and send the number N to the one or more non-serving base stations via a controller coupled to the serving base station and the one or more non-serving base stations. Another alternative is for the serving base station to send the number N to the one or more non-serving base stations via an interface between the serving base station and the one or more non-serving base stations. Still another alternative is for the technology to be implemented in the radio network controller.

Thus, the number of HARQ transmissions N associated with a mobile connection is provided to one or more non-serving base stations (NodeBs) so that each base station may take the correct number N of HARQ transmissions into account in the combination of HARQ transmissions from the mobile terminal corresponding to one HARQ process. In this way, a non-serving base station involved in a soft handover with the mobile connection (or soon to take over the mobile connection in a hard handover) knows that TTI bundling with N HARQ transmissions per bundle is taking place and can properly soft combine the different HARQ transmissions. In addition, macro-diversity gains remain intact when TTI bundling is used because buffer corruption is avoided thereby permitting non-serving base stations to contribute to the overall reception performance.

BRIEF DESCRIPTION OF THE DRAWINGS

FIG. 1 is a diagram illustrating a round trip time (RTT) between an UE and a base station and a retransmission request from the UE to the base station;

FIG. 2 illustrates a cellular communications system with a mobile radio terminal communicating with a serving cell and a non-serving cell;

FIG. 3 timing diagram for enhanced uplink (EUL) showing a 2-msec E-DCH TTI;

FIGS. 4A-4D are non-limiting example timing diagrams for TTI bundling with bundle sizes of 1, 2, 4, and 8 TTIs;

DETAILED DESCRIPTION

Figure 5:
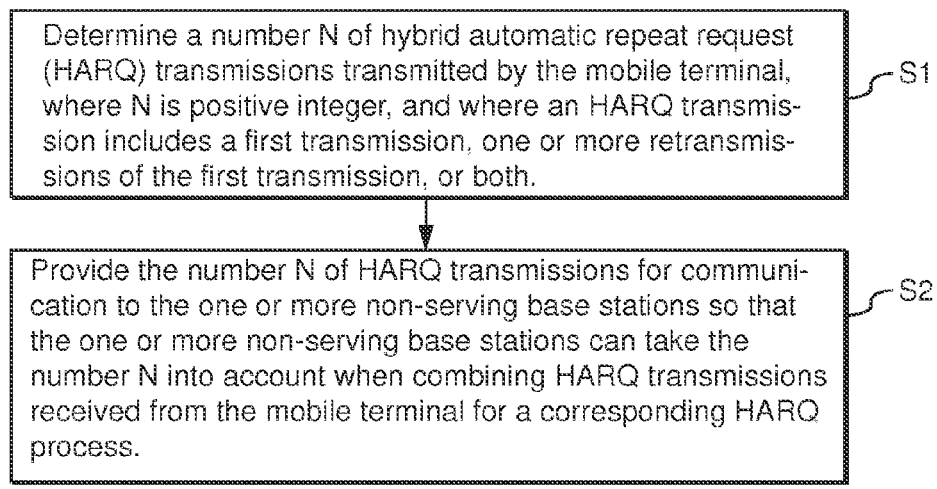
FIG. 5 is a function block diagram of a non-limiting WCDMA example radio communications system.

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

The technology may be used in any type of cellular communications. For ease of description, the term mobile radio or mobile terminal is used and encompasses any kind of radio communications terminal/device like user equipment (UE), PDAs, cell phones, laptops, etc.

As explained in the background, many of today's radio communications use fast hybrid ARQ (HARQ). The fast hybrid ARQ (HARQ) between a mobile terminal and a base station involves a set of HARQ transmitting and receiving entities located in the base station and mobile terminal respectively, which entities are also referred to as HARQ processes. Each HARQ process corresponds to a data queue or buffer associated with a transmitted data unit. HARQ between the mobile terminal and the base station also employs soft combining where the base station temporarily stores a data block having an error and subsequently combines the stored data block with a retransmitted data block (or a portion of the corresponding data block), the resultant combination hopefully thus being error free.

FIG. 3 illustrates an HARQ retransmission protocol for enhanced uplink (EUL) communications with a 2-msec E-DCH TTI. For a 2 msec TTI, there are 8 independent HARQ processes, indicated with 8 different shadings in the figure. If an HARQ (re)transmission fails, the next HARQ retransmission come 8*2=16 msec later, which corresponds to the round trip time (RTT) between the mobile terminal and the base station. In this case, 3 HARQ retransmissions (not including the original transmission) take 2+3*16 msec=50 msec. Because it is sometimes known in advance, predictable, or advisable that several retransmissions will be needed, autonomous retransmissions may be performed for the E-DCH.

With autonomous retransmissions or TTI bundling, the mobile terminal transmits a positive integer number N of consecutive HARQ transmissions of the same data block (the data block using a corresponding HARQ process) without waiting for an HARQ NAK before the next retransmission of that same data block. Non-limiting examples of a data block are a subframe, a packet, a transport block, etc. The number N of consecutive HARQ transmissions is the TTI bundle size. Since the delay between these HARQ transmissions has been eliminated, it is possible to perform a higher number of HARQ transmissions for a given maximum delay, which results in enhanced coverage for delay sensitive services such as speech. In the example just given, the mobile terminal transmitter could (if it knows that three retransmissions are needed) perform all four HARQ transmissions in consecutively in one bundle, thus completing the transmissions in 8 ms instead of 50 ms. N=4 for the 111 bundle in this example.

Non-limiting example bundle sizes for EUL with a 2 ms TTI could be N=1, 2, 4, or 8 TTIs corresponding to 2, 4, 8, or 16 msec, respectively, where the largest bundle size N=8 gives significantly better coverage than the 10-ms TTI. The TTI bundle size N may be determined and/or controlled for example by the serving base station, the mobile terminal, or to an RNC.

The HARQ RTT and the number of HARQ processes may be adjusted in one non-limiting example according to the following Table 1 (below). Example adjustments are illustrated in FIGS. 4A-4D.

TABLE 1

HARQ RTT and number of HARQ processes for different TTI bundle sizes (2 ms TTI)

| TTI bundle size | HARQ RTT | Number of HARQ processes |
| --- | --- | --- |
| 1 TTI (2 ms) | 8 subframes (16 ms) | 8 |
| 2 TTIs (4 ms) | 16 subframes (32 ms) | 8 |
| 4 TTIs (8 ms) | 16 subframes (32 ms) | 4 |
| 8 TTIs (16 ms) | 16 subframes (32 ms) | 2 |

FIG. 4A is a timing diagram for TTI bundling with a bundle size of N=1 TTI (2 ms), i.e., no TTI bundling. The TTI bundle retransmission takes place 16 ms after the first bundle transmission. FIG. 4B is a timing diagram for TTI bundling with a bundle size of 2 TTIs (4 ms). The TTI bundle retransmission takes place 32 ms after the first bundle transmission. FIG. 4C is a timing diagram for TTI bundling with a bundle size of 4 TTIs (8 ms). The TTI bundle retransmission takes place 32 ms after the first bundle transmission. FIG. 4D is a timing diagram for TTI bundling with a bundle size of 8 TTIs (16 ms). The TTI bundle retransmission takes place 32 ms after the first bundle transmission. The increase in HARQ RTT (from 16 ms to 32 ms) ensures that the minimum time between the end of a first bundle and the beginning of a retransmitted bundle is at least as large without bundling (16 ms).

As explained earlier, handover presents a problem with respect to TTI bundling. If a non-serving base station (see base station B in the simple example shown in FIG. 2) involved in a soft handover with the mobile connection (or soon to take over the mobile connection in a hard handover) is not made aware that TTI bundling with N HARQ transmissions per bundle is taking place, then the non-serving base station will likely not properly combine the proper number of HARQ transmissions for each active HARQ process. The result is performance degradation caused by buffer corruption and reduced macro diversity gain. In order to retain soft handover gain, each non-serving base station involved in a handover of the mobile connection must properly receive and combine the proper number N of the HARQ transmissions sent from the mobile terminal in each TTI bundle corresponding to the same HARQ process. Accordingly, the non-serving base stations should be made aware of the currently used bundle size N. The non-serving base stations may receive this information either via the RNC, the serving base station, or from the mobile terminal. The bundle size N may for example be signaled to non-serving base stations only when it changes (e.g., using some indication in the MAC layer), or an HARQ process ID could be signaled together with every HARQ transmission, e.g., using some reinterpretation of a Retransmission Sequence Number (RSN) field.

FIG. 5 is flowchart illustrating example procedures for communicating the number N of HARQ transmissions or processes in a TTI bundle to one or more non-serving base stations. First, a number N of hybrid automatic repeat request (HARQ) transmissions transmitted by the mobile terminal is determined (step S1). N is preferably a positive integer. An HARQ transmission includes a first transmission, one or more retransmissions of the first transmission, or both. Then, the number N of HARQ transmissions is provided either directly or indirectly to the one or more non-serving base stations so that the one or more non-serving base stations can take the number N into account when combining HARQ transmissions received from the mobile terminal for the corresponding HARQ process (step S2).

Figure 6:
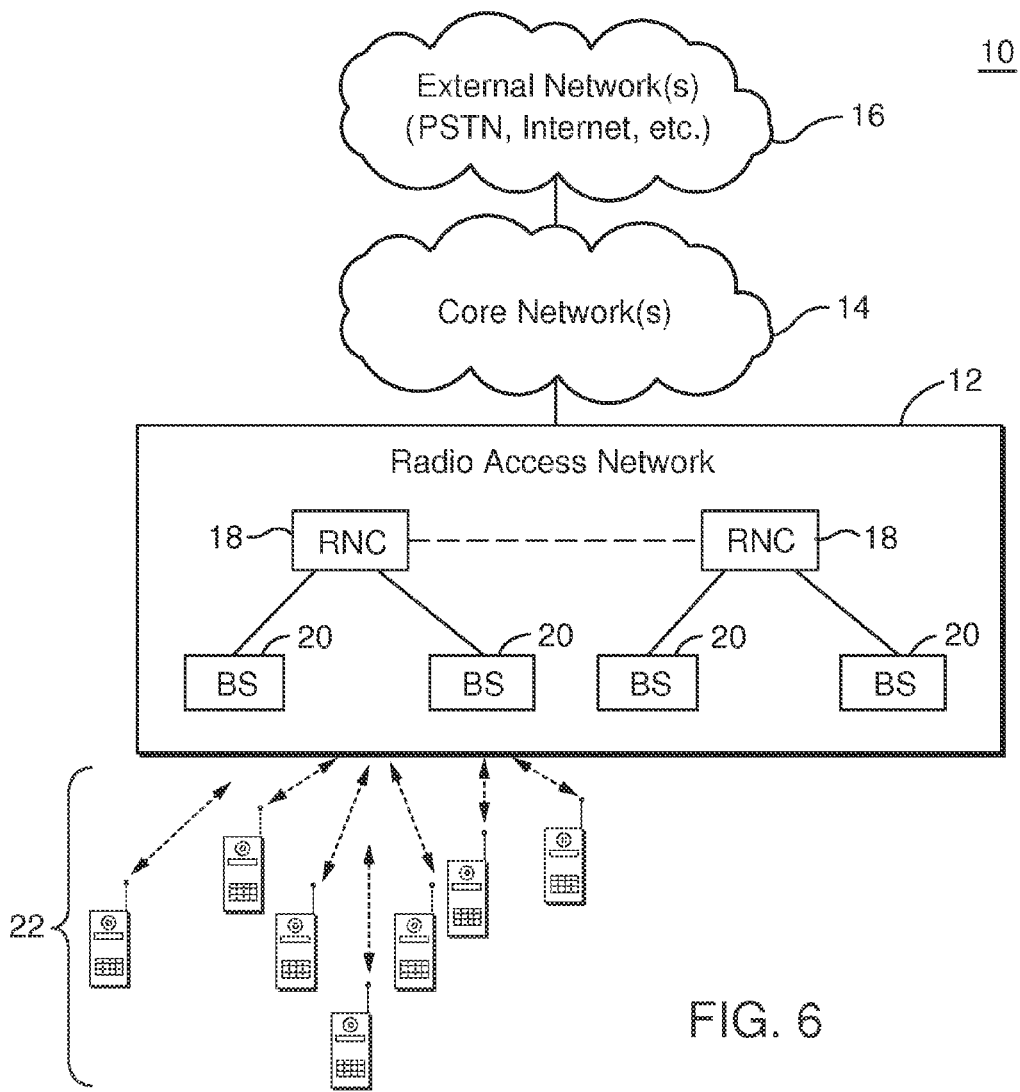
FIG. 6 is a flow chart illustrating example procedures for providing the number of HARQ transmissions to one or more non-serving base stations.

One example application of this technology is in a UMTS cellular radio system. FIG. 6 is a function block diagram of a non-limiting Third Generation (3G) cellular radio system referred to as a Universal Mobile Telecommunications System (UMTS) operating in Code Division Multiple Access (WCDMA) WCDMA indicated generally by reference numeral 10. A radio access network (RAN) 12 is coupled to one or more core networks 14, which in turn, are coupled to one or more external networks 16, like the Internet, the PSTN, ISDN, etc. The radio access network 12 includes, for example, one or more radio network controllers (RNCs) 18 that may communicate signaling and/or traffic to each other. Each RNC 18 controls one or more radio base stations (BSs) 20. Each base station 20 transmits information over a radio interface in one or more corresponding coverage areas called cells over a variety of downlink radio channels. Each base station 20 also receives uplink communications over the radio interface from mobile radios 22 in or near the base station's cell(s) again using one or more uplink channels.

Figure 7:
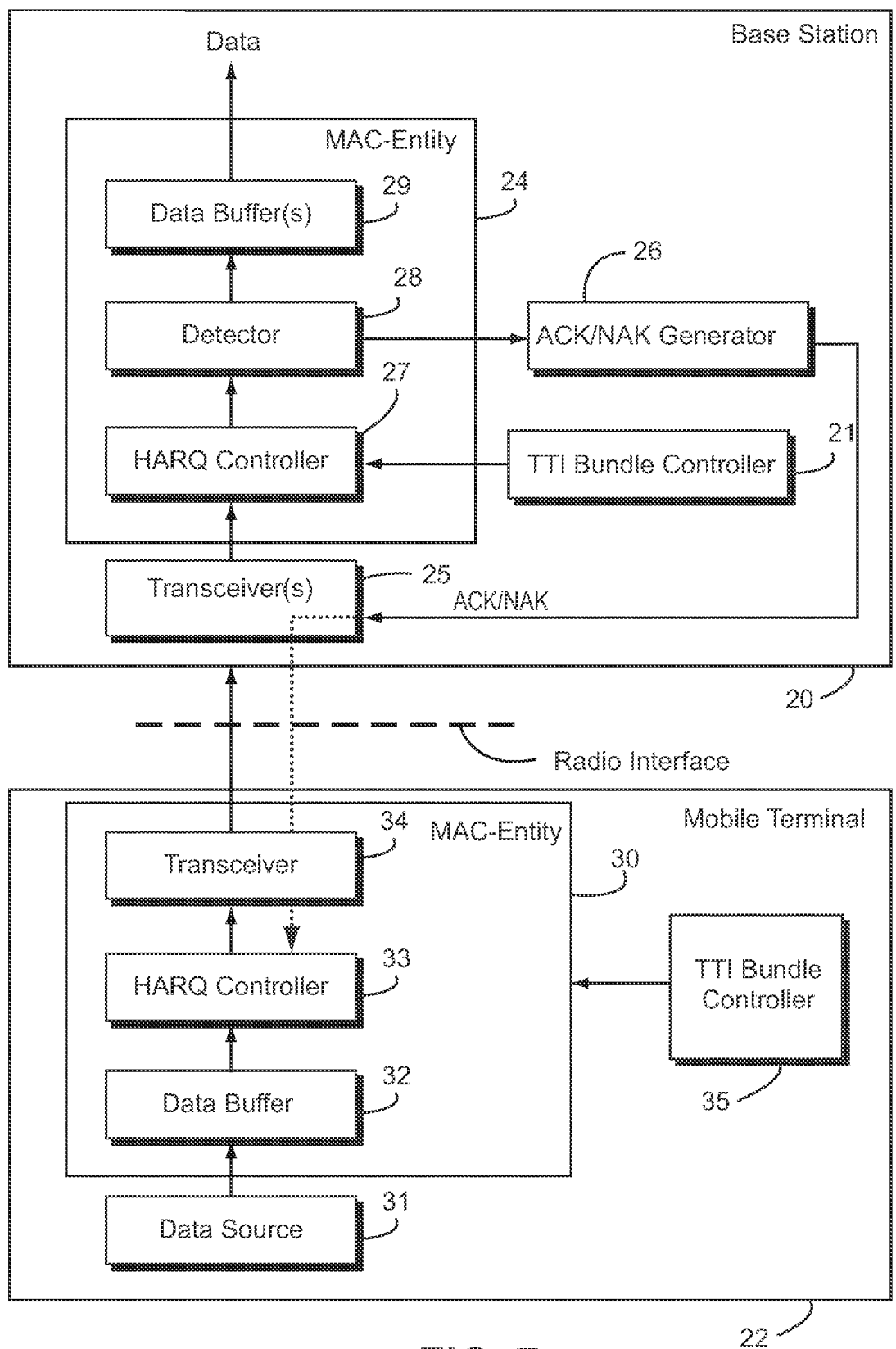
FIG. 7 includes function block diagram of an example mobile terminal and base station for implementing the method in FIG. 7.

FIG. 7 is a non-limiting function block diagram of an example mobile terminal and base station for implementing the method in FIG. 6. The base station 20 and mobile terminal 22 communicate with radio transmissions over a radio interface. The arrow crossing the radio interface can represent HSUPA transmissions over an E-DCH channel which carries the data transmitted using the enhanced uplink features. Other E-DCH-related channels, such as E-DPCCH, are understood to be in operation by the person skilled in the art. Alternatively, the arrow can represent an uplink channel utilized for UTRAN Long Term Evolution (LTE) or some other system.

The mobile terminal 22 includes a media access control (MAC)-entity 30 having a data buffer 32 for receiving data packets from a data source 31. The data source 31 can be, for example, one or more applications which generate or otherwise originate/receive data for transmission to the base station 20. The buffered packets are passed through an HARQ controller 33 which is coupled to a radio transceiver 34. The HARQ controller 33 is used for downlink transmissions from the base station 20 and performs retransmissions and other HARQ-related functions for data to be transmitted using active HARQ processes.

The base station 20 receives data on a channel (e.g., the E-DCH) over the air interface from the mobile terminal 22 using one or more base station transceivers 25. A base station MAC-entity 24 includes a base station HARQ controller 27 which determines whether the data in each TTI is received properly and soft combines retransmitted HARQ data with earlier received HARQ data corresponding to the same active HARQ process. A detector 28 determines whether any HARQ transmission in the TTI bundle is accurately received, and if so, sends a signal to an ACK/NAK generator 26 which generates a TTI bundle acknowledgement (ACK) which is sent via the transceiver 25 back to an HARQ controller 33 in the mobile terminal 22. The HARQ controller 33 in the mobile terminal stops the retransmissions of data for which acknowledgments are received. If the data is not accurately received, the detector sends a NAK via the transceiver 25 back to the mobile terminal 22 requesting retransmission of the data corresponding to that HARQ process. One or more data buffers 29 receive and store properly detected data blocks prior to sending on to a core network node or another radio network node such as radio network controller (RNC).

Assume that the base station 20 is a serving base station for the mobile terminal 20 and that the mobile terminal is about to enter or is in a handover (soft or hard). In one non-limiting example embodiment, a TTI bundle controller 21 in the serving base station 20 decides the number of N TTIs to be transmitted in a TTI bundle and signals N or some indication of N via the MAC entity 30 transceiver(s) 25 to the mobile terminal 22, e.g., using downlink protocol layer L1 and/or L2 signaling. Non-limiting examples of such signaling might include an indication on physical layer L1 control channels such as HS-SCCH and E-AGCH or one or more special fields or values in the MAC layer. In this non-limiting example, the mobile terminal 22 may then transmit the indication of N to one or more non-serving base stations using uplink L1 and/or L2 signaling to all non-serving base stations in the mobile's active set or actively involved in handover of the mobile's connection.

In another alternative example embodiment, an RNC receives the indication of N from the serving base station, and the RNC then sends that indication of N onto the non-serving base stations. Iub/Iur signaling may be used for this purpose, but may be slower than air interface L1/L2 signalling. As a result, there may be a performance degradation during a limited period until the non-serving base station(s) receive the indication of N via the RNC. Another variation is for the serving base station to signal the indication of N to the non-serving base station(s) via NodeB-to-NodeB signalling. In yet another non-limiting example embodiment, a TTI bundle controller 22 in the mobile terminal 22 determines and indicates N to the serving and the non-serving base stations using uplink L1 and/or L2 signaling.

The above-mentioned indications via uplink L1 and/or L2 signaling from the UE to one or more base stations could, e.g., use one of the following: special reserved E-DCH Radio Network Temporary Identifier (E-RNTI) or HS-DSCH Radio Network Temporary Identifier (H-RNTI) values or other special reserved fields or values in MAC L2, special reserved E-DCH Transport Format Combination Identifier (E-TFCI), Retransmission Sequence Number (RSN), or Channel Quality Indicator (CQI) values, other special reserved fields or values in uplink physical control channels like DPCCH, E-DPCCH and HS-DPCCH, or be signalled by using the absence or presence of uplink physical control channels, e.g., an E-DPCCH transmission without the usual accompanying E-DPDCH transmission or vice versa.

When N is indicated to non-serving (and possibly also serving) base stations, it may be beneficial if the mobile terminal (or other communicating entity) tries to ensure that the indication reaches every base station intended by, e.g., continuing to retransmit the indication of N until it receives a positive ACK from those base stations (preferably with some restriction on the total number of retransmissions).

In yet another non-limiting example embodiment, an RNC or other network node provides the serving base station and the mobile terminal with this TTI bundle size using, e.g., layer L3 signalling. Non-serving base stations may for example receive this indication via Iub and/or Iur interfaces. To avoid frequent and time-consuming L3 signalling, the TTI bundling size N may be (semi-)statically tied to some other parameter, e.g., the number of base stations in the user's active set. For example, if it can be assumed that a user with more than one base station in its active set (i.e., a user in soft handover) is relatively likely to be in a bad coverage situation and is likely to benefit from TTI bundling, N could be set to 2; otherwise, N could be set to 1.

Figure 8A:
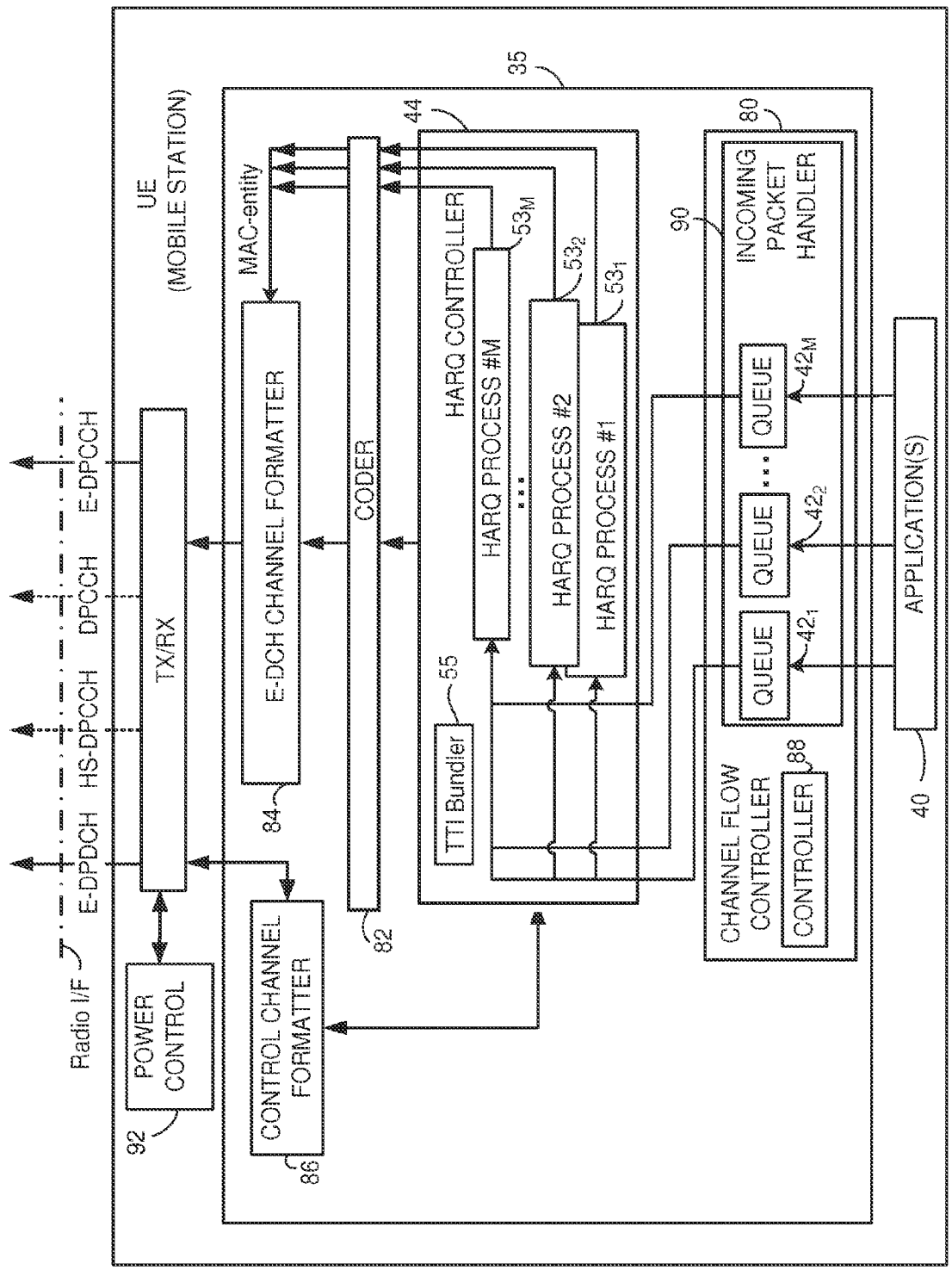
FIGS. 8A and 8B are function block diagrams of more detailed, but still example mobile terminal and base station implementations.
Figure 8B:
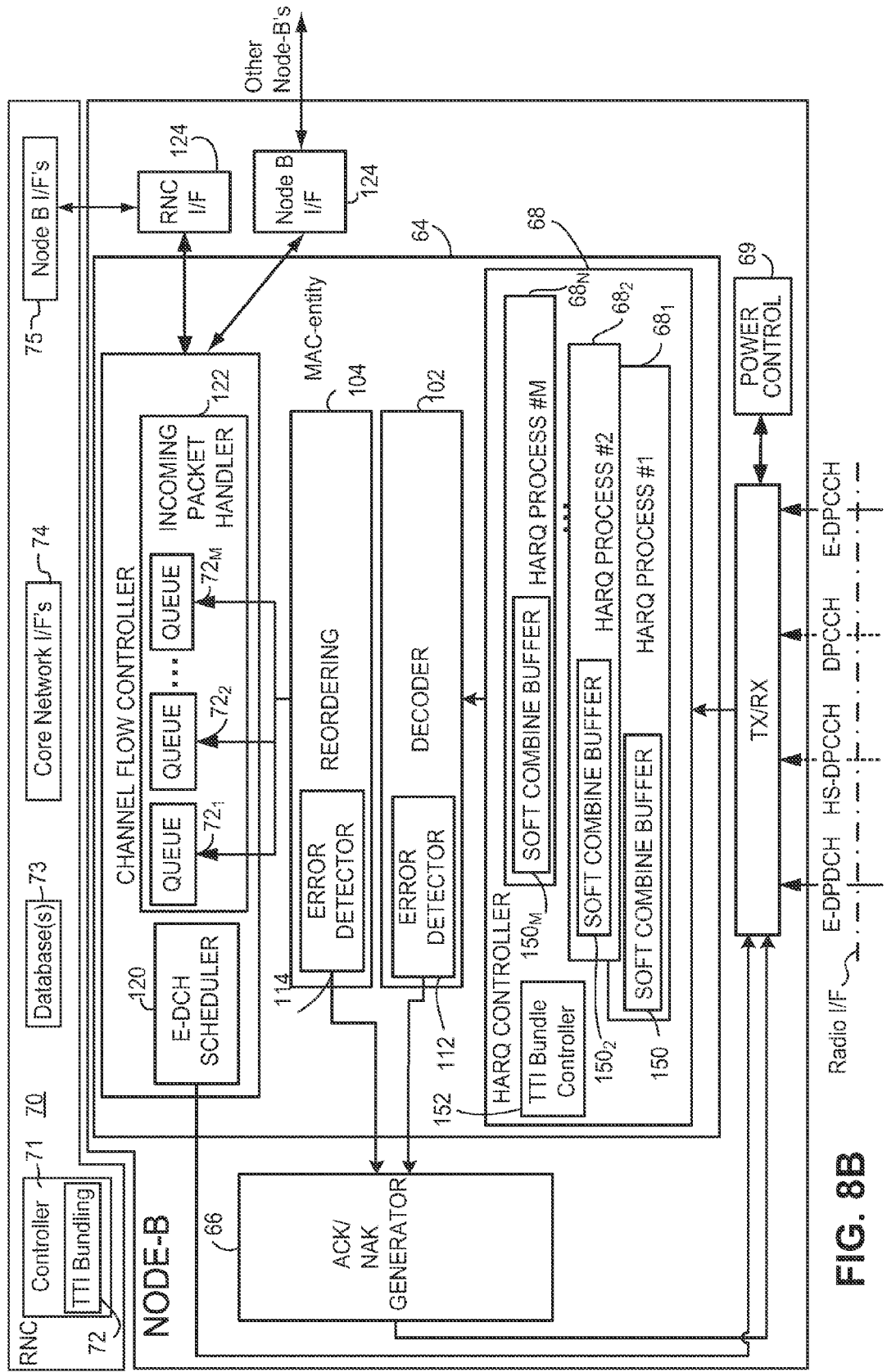

FIGS. 8A and 8B are function block diagrams of more detailed, but still example mobile terminal (referred to as a UE here), base station, and/or RNC implementations for a non-limiting, example HSUPA embodiment. In FIG. 8A showing the UE, the E-DCH data source is shown to be one or more applications 40. The UE MAC-entity 35 of the user equipment unit includes a UE HARQ controller 44, a channel flow controller 80, coder 82, E-DCH channel formatter 84; and control channel formatter 86. The channel flow controller 80 includes an E-DCH controller 88 and incoming packet handler 90. The incoming packet handler 90 includes one or more data queues, such as data queues $42_1$-$42_M$ shown, each data queue 42 being associated with a different data flow (e.g., from a different one of the applications 40). The E-DCH controller 88 controls the extraction of data from the data queues 42 and the formatting of the E-DCH channel by E-DCH channel formatter 84 in accordance with transmission scheduling granted to the user equipment unit by base station in accordance with the scheduling related data provided to the base station by the user equipment unit.

The coder 82 performs coding of the E-DCH-prone data prior to associating such data with an appropriate one of HARQ processes $53_1$-$53_M$ of UE HARQ controller 44 or after such associating. The latter is shown in FIG. 8A. Coding actions performed by coder 82 can include, for example, multiplexing of data from different data queues 42 or from different HARQ processes and adding MAC headers. The UE HARQ processes $53_1$-$53_M$ of UE HARQ controller 44 correspond to the M number of transmission time intervals utilized for the E-DCH, e.g., M=eight in an example implementation.

FIG. 8A further shows that transceiver 53 transmits not only the E-DPDCH channel, but also other channels such as E-DPCCH, DPCCH, and HS-DPCCH. The content of control channels such as E-DPCCH is prepared and formatted by control channel formatter 86. The user equipment unit also typically includes a power control unit 92 for controlling radio transmit power.

FIG. 8B shows, in more detail, an RNC 70 and a base station (referred to as a NodeB here) according to the non-limiting, example HSUPA embodiment. The RNC 70 includes a controller 71 which includes an optional TTI bundling control entity 72 for determining the value of N for a mobile connection as per that alternative non-limiting to embodiment described above or for controlling the indication of N received via a serving base station to one or more non-serving base stations as per other alternative non-limiting embodiments described above. The RNC 70 includes NodeB interfaces 75 for such communications. The RNC 70 further includes database(s) 73 and core network interfaces 74.

The base station MAC-entity 64 of the NodeB includes a base station HARQ controller 68, a decoder 102, a reordering unit 104, and a channel flow controller 106. Each decoder 102 and reordering unit 104 can have respective error detection processes 112, 114. Decoding detector 112 determines when a coding algorithm detects an error, and out-of-order detector 114 determines that data for a transmission time interval has not been received or lost. Both decoding detector 112 and out-of-order detector 114 notify ACK/NAK generator 66 so that ACK/NAK generator 66 can generate an appropriate feedback message (e.g., either an ACK message or a NAK message) to the UE. For this reason, ACK/NAK generator 66 is shown as being connected to base station transceiver 56. In principle, there may be one processing chain for each HARQ process, but HARQ processing functions may also be implemented as serial processing rather than parallel processing.

The channel flow controller 106 includes E-DCH scheduler 120 and incoming packet handler 122. The E-DCH scheduler 120 determines which transmission time intervals and grants the UE can use, and sends information indicative thereof to E-DCH scheduler 88 of the UE. The incoming packet handler 122 includes plural data queues 721-72M, each data queue 72 being used for a different data flow. E-DCH data is conveyed from incoming packet handler 122 to an RNC interface 124.

The NodeB HARQ controller 68 includes, for each of its base station HARQ processes, a corresponding soft combination buffer 150 for use in a soft combination operation. HARQ controller 68 also includes a TTI bundle controller 152 for determining, in certain non-limiting embodiments described above, an indication of N TTIs in a TTI bundle for a mobile connection and/or sending that indication of N to one or more non-serving NodeBs.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method in a mobile radio terminal which transmits information in transmission time intervals (TTIs) that is received by a serving base station and by one or more non-serving base stations, the method comprising:
   determining a number N of hybrid automatic repeat request (HARQ) transmissions transmitted together by the mobile terminal as a TTI bundle containing two or more TTIs, where N is a positive integer greater than 1, and where an HARQ transmission includes a first transmission, one or more retransmissions of the first transmission, or both, and where each of the N HARQ transmissions in the TTI bundle corresponds to the same transport block of data associated with the same HARQ process, and
   providing the number N of HARQ transmissions for communication to the one or more non-serving base stations so that the one or more non-serving base stations can take the number N into account when combining HARQ transmissions received from the mobile terminal.

2. The method in claim 1, wherein the method is performed in the mobile terminal.

3. The method in claim 2, wherein the serving base station, the one or more non-serving base stations, and the mobile terminal are involved in a handover, and wherein the mobile terminal receives the number N from a controller coupled to the serving base station.

4. The method in claim 3, wherein the controller is located in the serving base station.

5. The method in claim 3, wherein the controller is located in a radio network controller coupled to the serving base station and the one or more non-serving base stations.

6. A method in a radio network controller of a cellular radio communication system in which a mobile radio terminal transmits information in transmission time intervals (TTIs) that is received by a serving base station and by one or more non-serving base stations, the method comprising, the radio network controller being coupled to the serving base station and the one or more non-serving base stations, the method comprising:
   determining a number N of hybrid automatic repeat request (HARQ) transmissions transmitted together by the mobile terminal as a TTI bundle containing two or more TTIs, where N is a positive integer greater than 1, and where an HARQ transmission includes a first transmission, one or more retransmissions of the first transmission, or both, and where each of the N HARQ transmission in the TTI bundle corresponds to the same transport block of data associated with the same HARQ process, and
   providing the number N of HARQ transmissions for communication to the one or more non-serving base stations so that the one or more non-serving base stations can take the number N into account when combining HARQ transmissions received from the mobile terminal.

7. Apparatus for use in a cellular radio communication system in which a mobile radio terminal transmits information in transmission time intervals (TTIs) that is received by a serving base station and by one or more non-serving base stations, the apparatus comprising circuitry, the circuitry is configured to: determine a number N of hybrid automatic repeat request (HARQ) transmissions transmitted together by the mobile terminal as a TTI bundle containing two or more TTIs, where N is a positive integer greater than 1, and where an HARQ transmission includes a first transmission, one or more retransmissions of the first transmission, or both, and where each of the N HARQ transmissions in the TTI bundle corresponds to the same transport block of data associated with the same HARQ process, and provide the number N of HARQ transmissions for communication to the one or more non-serving base stations so that the one or more non-serving base stations can take the number N into account when combining HARQ transmissions received from the mobile terminal.

8. The apparatus in claim 7, wherein the apparatus is in the mobile terminal.

9. The apparatus in claim 8, wherein the serving base station, the one or more non-serving base stations, and the mobile terminal are involved in a handover, and wherein the mobile terminal is arranged to receive the number N from a controller coupled to the serving base station.

10. The apparatus in claim 9, wherein the controller is located in the serving base station.

11. The apparatus in claim 9, wherein the controller is located in a radio network controller coupled to the serving base station and the one or more non-serving base stations.

12. The apparatus in claim 7, wherein the apparatus is located in the serving base station,
wherein the serving base station, the one or more non-serving base stations, and the mobile terminal are involved in a handover, and
wherein the serving base station is arranged to send the number N to the one or more non-serving base stations via an interface between the serving base station and the one or more non-serving base stations.

13. The apparatus in claim 7, wherein the apparatus is located in the serving base station,
wherein the serving base station, the one or more non-serving base stations, and the mobile terminal are involved in a handover,
wherein the serving base station is arranged to send the number N to the one or more non-serving base stations via a radio network controller connected to the serving base station and the one or more non-serving base stations.

14. The apparatus in claim 7, wherein the apparatus is located in a radio network controller coupled to the serving base station and the one or more non-serving base stations.

15. A method in a serving base station of a cellular radio communication system in which a mobile radio terminal transmits information in transmission time intervals (TTIs) that is received by the serving base station and by one or more non-serving base stations, the method comprising:
determining a number N of hybrid automatic repeat request (HARQ) transmissions transmitted together by the mobile terminal as a TTI bundle containing two or more TTIs, where N is a positive integer greater than 1, and where an HARQ transmission includes a first transmission, one or more retransmissions of the first transmission, or both, and where each of the N HARQ transmissions in the TTI bundle corresponds to the same transport block of data associated with the same HARQ process, and
providing the number N of HARQ transmissions for communication to the one or more non-serving base stations so that the one or more non-serving base stations can take the number N into account when combining HARQ transmissions received from the mobile terminal.

16. The method in claim 15,
wherein the serving base station, the one or more non-serving base stations, and the mobile terminal are involved in a handover, and
wherein the serving base station sends the number N to the one or more non-serving base stations via a controller coupled to the serving base station and the one or more non-serving base stations.

17. The method in claim 15,
wherein the serving base station, the one or more non-serving base stations, and the mobile terminal are involved in a handover, and
wherein the serving base station sends the number N to the one or more non-serving base stations via an interface between the serving base station and the one or more non-serving base stations.

18. Apparatus for use in a cellular radio communication system in which a mobile radio terminal transmits information in transmission time intervals (TTIs) that is received by a serving base station and by one or more non-serving base stations, the apparatus comprising:
means for determining a number N of hybrid automatic repeat request (HARQ) transmissions transmitted together by the mobile terminal as a TTI bundle containing two or more TTIs, where N is a positive integer greater than 1, and where an HARQ transmission includes a first transmission, one or more retransmissions of the first transmission, or both, and where each of the N HARQ transmissions in the TTI bundle corresponds to the same transport block of data associated with the same HARQ process, and
means for providing the number N of HARQ transmissions for communication to the one or more non-serving base stations so that the one or more non-serving base stations can take the number N into account when combining HARQ transmissions received from the mobile terminal.

* * * * *

UNITED STATES PATENT AND TRADEMARK OFFICE
CERTIFICATE OF CORRECTION

PATENT NO. : 8,526,397 B2  
APPLICATION NO. : 12/989519  
DATED : September 3, 2013  
INVENTOR(S) : Bergman et al.

Page 1 of 1

It is certified that error appears in the above-identified patent and that said Letters Patent is hereby corrected as shown below:

In the Specification

In Column 1, Line 51, delete "(E-TFCl)." and insert -- (E-TFCI). --, therefor.

In Column 5, Line 10, delete "TTL" and insert -- TTI. --, therefor.

In Column 5, Line 38, delete "111" and insert -- TTI --, therefor.

In Column 5, Lines 44-45, delete "or to an" and insert -- or an --, therefor.

In Column 9, Lines 17-18, delete "non-limiting to embodiment" and insert -- non-limiting embodiment --, therefor.

Signed and Sealed this  
Twentieth Day of May, 2014

Michelle K. Lee  
*Deputy Director of the United States Patent and Trademark Office*